United States Patent [19]
Hodkin et al.

[11] 4,016,990
[45] Apr. 12, 1977

[54] ROTATABLE DOCK

[76] Inventors: Lester H. Hodkin; James L. Hinson, both of c/o Mid-West Supply, 214 N. Summit, Arkansas City, Kans. 67005

[22] Filed: Nov. 17, 1975
[21] Appl. No.: 632,564
[52] U.S. Cl. .............................. 214/38 BB; 104/31
[51] Int. Cl.² ........................................ B61B 1/00
[58] Field of Search ..................... 214/38 B, 38 BB; 104/31, 35, 38, 43, 46

[56] References Cited
UNITED STATES PATENTS

| 517,000 | 3/1894 | Danzenbaker | 104/43 |
| 1,789,027 | 1/1931 | Tawse | 214/38 BB X |

*Primary Examiner*—Robert G. Sheridan
*Attorney, Agent, or Firm*—Fishburn, Gold & Litman

[57] ABSTRACT

A loading dock for loading and unloading objects from a vehicle, comprising a stationary floor section and a movable floor section disposed at one edge of the dock. The movable section is semi-circular in shape, meets the stationary section along the arc of a circle, and is mounted to rotate about the center of that circle. A truck approaches the loading dock in a parallel fashion and stops at a predetermined point thereby. The movable section is then rotated outwardly until said section is aligned with the loading opening in the body of the truck so as to form a dock extension for the moving of material thereon to and from the stationary floor section and truck.

8 Claims, 10 Drawing Figures

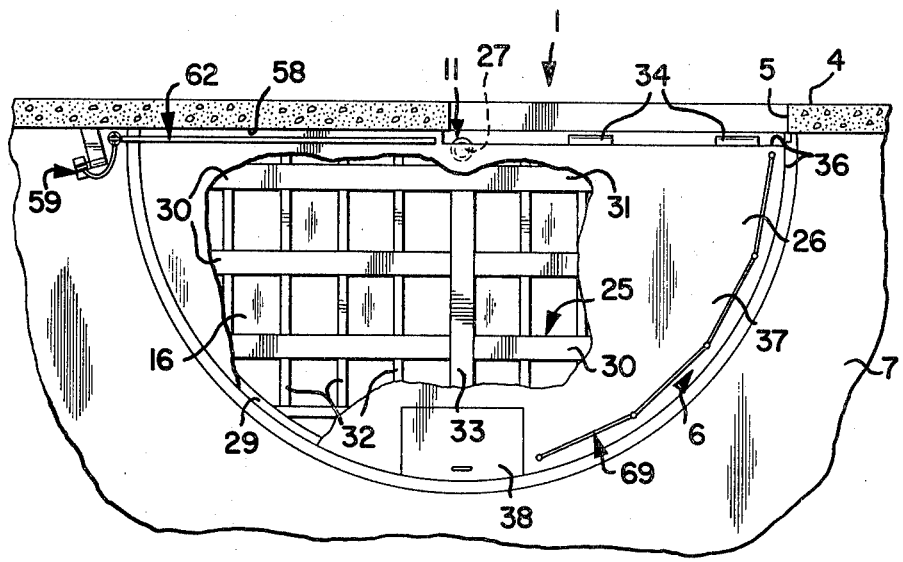
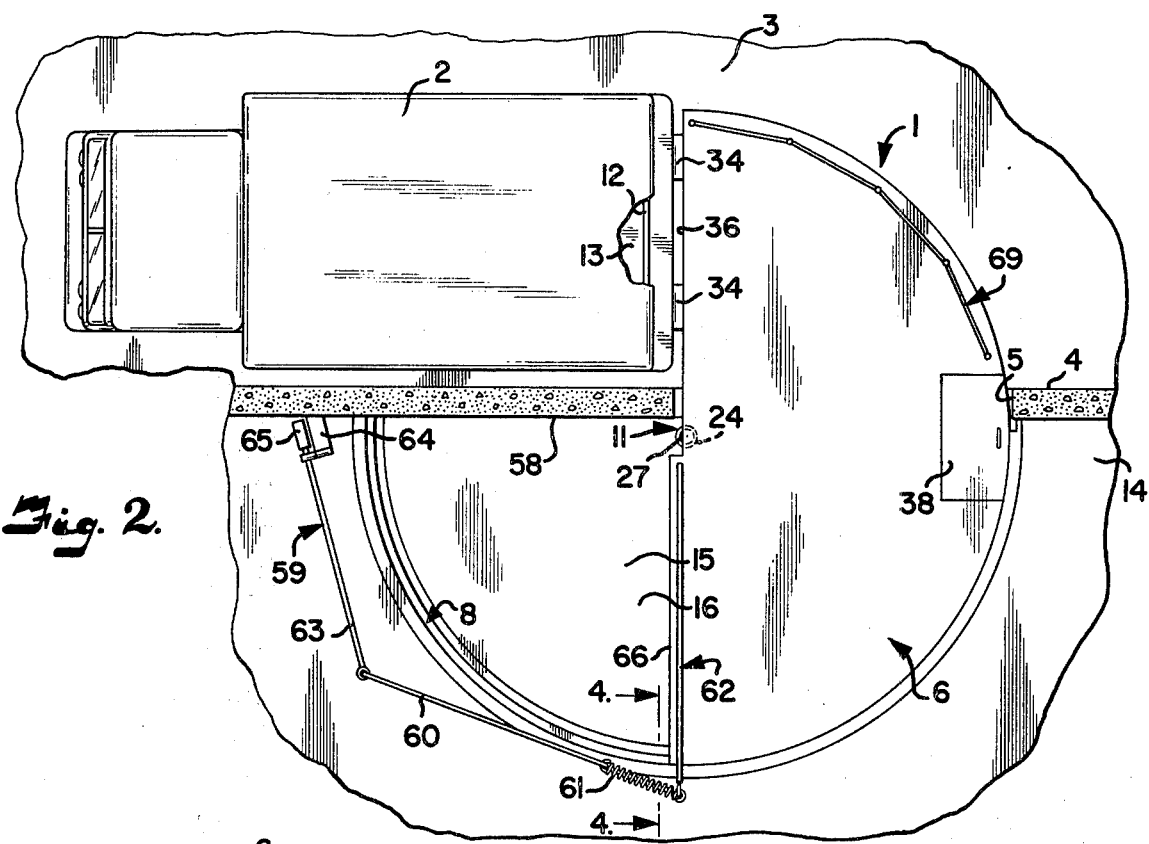
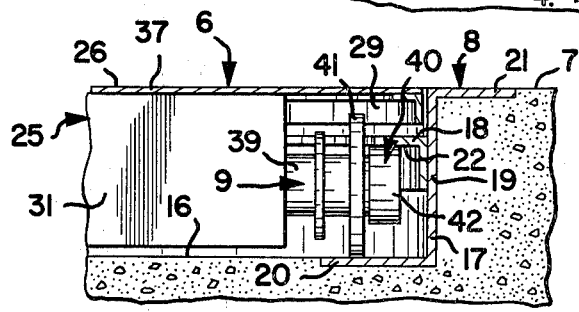

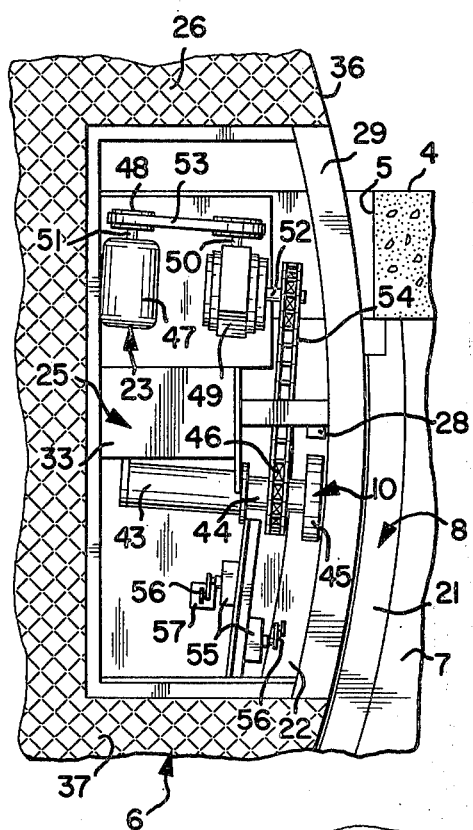
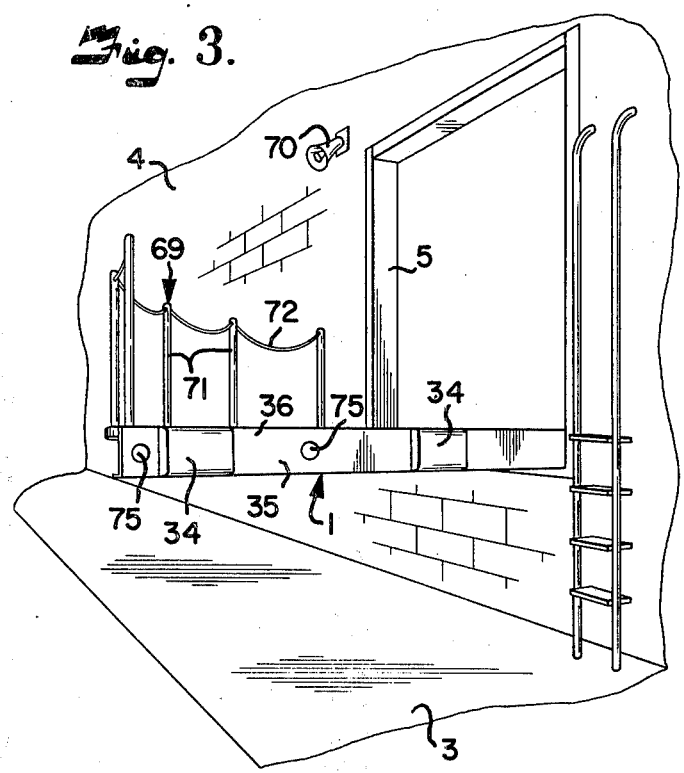
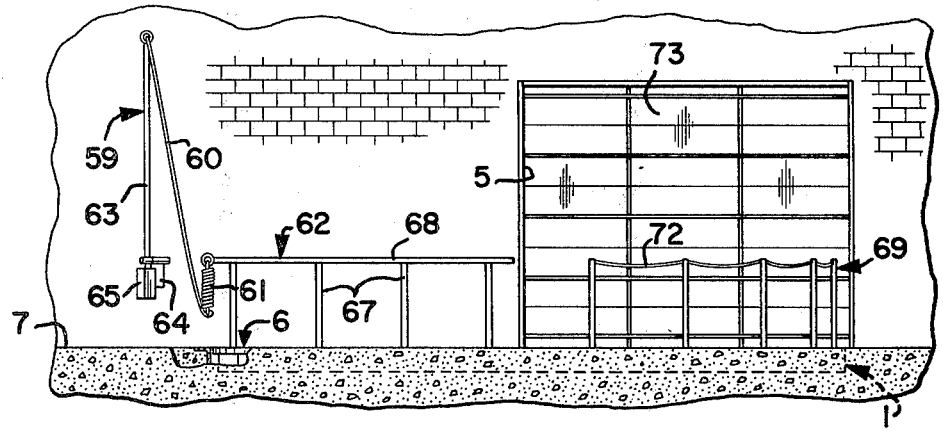
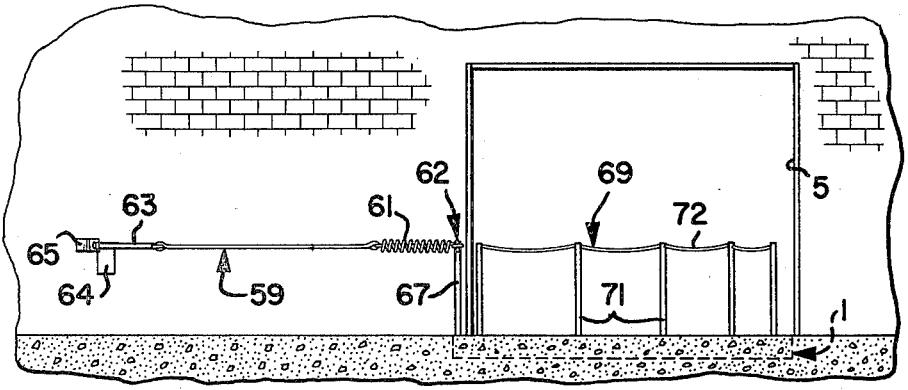

ROTATABLE DOCK

This invention relates to loading docks, and more particularly to rotatable loading docks with stationary and movable portions.

Loading docks at a height near the height of a vehicle floor are common for facilitating the loading and unloading of objects to and from vehicles positioned at the dock or platform. Many buildings particularly in older or built-up sections of a city have doors in a rear wall for receiving goods. Such buildings typically have the rear walls or alleys wherein, due to other buildings, the trucks, trailers or other delivery vehicles can only move in parallel to the wall having the door opening. With a building floor of approximately the truck body floor height, the goods or cartons must still be unloaded, lowered to ground level, and then moved to the door and raised to the floor height. While bridges have been proposed to extend between the building floor and the truck tailgate, such a bridge is so limited in use that it is not a suitable solution to the problem.

The principal objects of the present invention are: to provide a rotatable loading dock for facilitating the loading and unloading of vehicles disposed at an angle of up to and including 90° to the dock; to provide such a structure wherein a portion of the dock is a semi-circular, movable section capable of rotating 90° so as to bring an edge thereof in abutting contact with the rear end loading opening of a vehicle on a plane coincident with that of the vehicle body's floor; to provide such a structure wherein the movable section is provided with a rigid support frame which can support substantial weight including that of freight and transport vehicles therein; to provide such a structure wherein a track, rollers and a central pivot are provided so that a cantilevered portion of the movable section can support such substantial weight without tipping; to provide such a structure wherein power means are operably connected to the movable section for selectively rotating same to and from a vehicle; to provide such a structure wherein means for controlling the rotation of the movable section are provided whereby an opposing torque of predetermined intensity applied to the movable section will cause same to cease; to provide such a structure wherein electrical means automatically stop the rotation of the movable section upon reaching a fully retracted and fully extended position; to provide such a structure wherein the movable section is disposed adjacent and extendable through a pre-existing door opening in a building; to provide such a structure wherein means prevent the movable section from extending until the door is open to prevent destructive contact therebetween; to provide such a structure wherein visual and audio alarm means warn passersby of dock extension; to provide such a structure wherein a guard rail is removably connected to a portion of the movable sections's arcuate periphery to prevent persons and objects falling from the extended movable section into the alley, the rail being removable so as not to obstruct the transfer of goods over the retracted movable section; to provide a structure wherein an extendible guard rail extends along a portion of the arcuate periphery of the extended movable section to prevent persons and objects from falling from the stationary floor section's surface into the recess therein; to provide such a structure wherein a stationary guard rail is attached to a linear portion of the movable section to prevent persons and objects from falling from the movable section into the recess; and to provide such a loading platform which is economical to manufacture, efficient in use and capable of long operating life and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features of the apparatus.

FIG. 1 is a top plan view of the rotatable dock in the retracted position.

FIG. 2 is a top plan view of the rotatable dock in the extended position with a vehicle alongside the building.

FIG. 3 is a perspective view of the rotatable dock in the extended position.

FIG. 4 is an enlarged fragmentary, horizontal cross-sectional view of the rotatable dock taken along the line 4—4 of FIG. 2.

FIG. 5 is an enlarged, fragmentary top plan view of the rotatable dock particularly showing the drive mechanism.

FIG. 6 is a side view of the rotatable dock (in the retracted position), safety rails, and building as viewed looking outwardly.

FIG. 7 is a side view of the rotatable dock (in the extended position), safety rails, and building, viewed looking outwardly.

Figure 8:
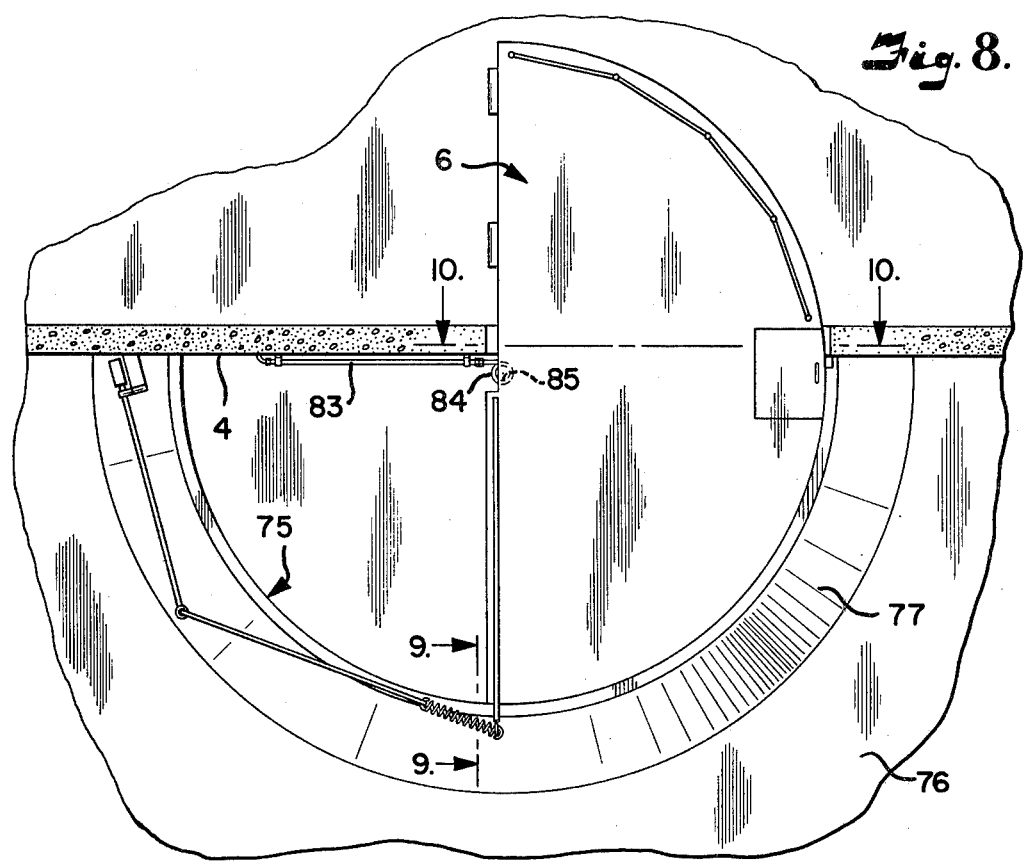
FIG. 8 is a top plan view of an above-floor embodiment of the rotatable dock in the extended position.

Referring more in details to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a rotatable dock for loading and unloading goods from a truck 2 parked parallel in a drive or alley 3 to a building 4, near an opening 5 therein. An arcuate, movable floor section 6 is rotatably supported in the stationary floor 7 of the building by a track 8, co-operating rollers 9 and 10, and central pivot 11. The movable section pivotally extends outwardly and, in a centilevered fashion, aligns itself with the loading door 12 of the parked truck, thus bridging the floors 13 and 14 respectively of the truck and building, for transporting goods therebetween. After the loading is completed, the movable section 6 is rotatingly retracted thereby freeing the alley 3 to traffic.

The structure illustrating the stationary floor section 7 in FIGS. 2 and 4 includes a semi-circular recess 15 in which the movable floor section 6 is disposed. The stationary floor section 7 is preferably constructed of concrete or other suitable flooring. A track 8 is disposed in the recess 15 about its arcuate periphery for supporting the movable section 6 in the recess. In the illustrated structure, the track 8 is channel-shaped and disposed at the bottom 16 of the recess. The track 8 is a structure suitably shaped for receiving and retaining co-operating rollers 9 nd 10, such as Z-bar 17 with an angle member 18 attached to the web 19 thereof. The Z-bar 17 has a pair of oppositely extending, parallel, normally horizontal flanges 20 and 21 and a normally vertical web 19 whose height is substantially equal to the depth of the recess 15. The lower flange 20 is disposed at the bottom 16 of the recess, and the upper flange 21 is disposed in and coplanar with, the surface of the stationary floor section 7 and serves as a protective edge about the upper arcuate edge of the recess. The angle member 18 is attached to the radially inward side of the web 19, one face 22 thereof being parallel to the lower flange 20 and spaced apart a predetermined distance, sufficient for the rollers to translate therein. The width of the face 22 is substantially shorter than that of the lower flange 20 such that portions of the rollers are disposed between the lower flange and angle member. The track 8 is constructed from a durable material having substantial strength, such as steel, to support loads in the range of several tons. The angle member 18 is rigidly fastened to the web 19 by means such as welding so that the intense forces which act thereon in reaction to the moment caused by loads being applied to the cantilevered portion of the movable section 6 do not sever the joint or inelastically deform the members 18 and 19.

A first central pivot member 24 is disposed in the center of the recess 15 and is rigidly affixed to the bottom 16 thereof.

The movable floor section 6 is arcuate in shape and in the structure illustrated in FIGS. 1, 4, and 5 includes a frame 25 for structurally supporting the movable section. A deck 26 is disposed on the upper portion of the frame 25 so as to provide a surface for the movable floor section 6. A second central pivot member 27 is attached to the center of the semi-circular frame 25, and mates with the first central pivot member 24 for rotating the movable section. The freewheeling roller 9 translates in the track 8 and is mounted to the frame 25. A drive roller 10 which also translates in the track 8, is mounted to the frame and is rotated by power means 23 which causes the movable section 6 to rotate.

The frame 25, as illustrated in FIG. 1, for structurally supporting the movable floor section 6, includes a first beam 29, semi-circular in shape, forming the arcuate portion of the movable section. A plurality of rectilinear second beams 30 being spaced apart and parallel, are attached at each end to the first beam 29. One of the second beams 30, base beam 31, is disposed over the center of the circle, and the second central pivot member 27 is fastened thereto. A plurality of rectilinear third beams 32 are spaced a predetermined distance apart along and between the second beams 30 and are perpendicularly fastened thereto, thus forming a grid of support beams having a semicircular periphery. One of the third beams 32, a radial beam 33, extends from the center of the base beam 31, at a right angle thereto, to the first beam 29. The radial beam 33, is fastened at one end to first beam 29 and at its other end to base beam 31. The second beams 30 and the radial beam 33 are preferably square and tubular in shape, while the remainder of the third beams 32 preferably have an I-shaped cross-section. Both the second and third beams are at substantial strength and depth in the order of 11 inches, such that very heavy loads can be supported thereon, and great bending stresses can be withstood without causing inelastic strain.

A pair of bumpers 34 are attached to face plate 35 along an edge portion 36 of the moveable section 6. The bumpers are constructed of a resilient material, such as rubber, and extend outwardly from the movable section for abutting contact with the rear end of a vehicle 2. The bumpers 34 serve to protect the abutting portions of the loading platform and the vehicle.

The deck 26 which provides a surface for the movable section 6 includes a semi-circular plate 37 disposed above and affixed to the frame 25 abutting the periphery thereof. The plate 37 preferably has a non-slip surface on its exterior face, as illustrated in FIG. 5, and has an aperture therein, preferably disposed at an angle of 90° from the center of the circle to provide access to the means for rotating the movable section 6. A hinged drive cover 38 which mates with the aperture is provided for covering said aperture.

The free wheeling roller 9 translates in the track 8 and is mounted to the frame 25, includes a shaft 39 connected at its innermost end to the base beam 31 of the frame. The axis of the shaft 39 lies in a line which passes through the axis of the central pivot members 24 and 27. A roller 40 is pivotally attached to the outermost end of the shaft 39 and includes a wheel portion 41, disc-like in shape, rotatably attached to the shaft by a bearing (not shown) and disposed on the innermost side of the roller. In use, the outer circumferential surface of the wheel portion 41 makes rolling contact with the lower flange 20 of the channel-shaped track 8. A second bearing 42 is attached to the shaft 39 at the outward face of the wheel 41. The outer bearing housing has a diameter substantially smaller than that of the wheel 41 and makes rolling contact with the lower surface of the angle member 18 of the track. Both the wheel 41 and the bearing 42 rotate freely and independently about the shaft 39. Normally, their rotation is in opposite directions and is of unequal speed, as they contact members 20 and 18 of the track respectively. The wheel 41 rotatably supports the movable section, and the bearing 42, retrains vertical translation of the wheel such that when the movable section is extended, and freight is placed on the unsupported portion thereof from a vehicle, the movable section will not tip.

The drive roller 10, as illustrated in FIG. 5, includes a cylindrical bearing housing 43 attached at its innermost end to the radial beam 33 of the frame 25. The axis of the housing 43 lies along a line passing through the axis of the central pivot members 24 and 27. A bearing (not shown) is provided inside the housing 43 in a coaxial relationship therewith. A shaft 44 is coaxially disposed in the housing 43 and the bearing, at its innermost end, for rotation therein. A disc-shaped friction roller 45 is attached to the shaft's outermost end. The circumferential surface of the roller 45 is adapted to roll on the lower flange of the track 8. The surfaces of both the circumferential edge of the roller 45 and the track 8 are smooth such that rotation of the movable section as the result of power being applied to the friction roller is possible only if sufficient frictional forces are developed between those surfaces. Hence, unlike a rack and pinion drive, the rotation of the movable section may be stopped if sufficient resistant torque acts against it. A sprocket 46 with teeth members exposed at its outer circumferential edge is attached to the shaft 44, adjacent the friction roller 45, and coaxial therewith for transmitting power from the drive means to the friction roller.

The drive means 23 includes a motor device 47 such as an electric, hydraulic, or pneumatic motor which is attached to the frame 25 and provided with a pulley 48 mounted on its shaft. A gear reducer 49 for increasing the torque and decreasing the speed of the motor, is affixed to the frame and is disposed a predetermined distance from the motor. The gear reducer 49 has a high speed shaft 50 which is disposed parallel to the motor's shaft 51 and is provided with a pulley affixed thereto. The high speed shaft 50 is connected through the gear reducer 49 to a low speed shaft 52 which is disposed perpendicularly to the high speed shaft, and a sprocket is affixed to the end thereof. A power transmisstion belt 53, such as a V-belt is disposed between the pulleys attached to the motor 47 and the gear reducer 49 in making frictional contact therewith. The motor's rotary motion is thereby transmitted and imparted to the high speed shaft of the gear reducer 49. A chain drive 54 is disposed between the sprockets attached to the gear reducer 49 and the shaft 39 of the drive roller, in gripping contact therewith, such that the rotary motion of the gear reducer's low speed shaft is transmitted and imparted to the drive roller shaft which in turn rotates the friction roller 45 and again in turn rotates the movable floor section 6.

A first means for controlling the rotation of the movable section 6, automatically stops said rotation when said section approaches the fully extended and fully retracted positions. The first means, which may also employ mechanical, pneumatic, or hydraulic systems, is illustrated as being electrical in nature, including a power cut-off switch 55 attached to the frame 25. A downwardly extending lever 56 is affixed to the central rotatable shaft of the switch 55. A pair of cubical cut-off pads 57 are disposed on the bottom 16 of recess 15, one of which is positioned near the edge of the platform at the opening 5 therein, such that when the movable section 6 is approaching the fully extended position, the lever 56 contacts the pad 57 so as to activate the switch 55 and interrupt the power to the drive motor 47, thus halting the movable section's rotation. The other pad is disposed approximately 90° from the first pad such that when the movable section is approaching the fully retracted position, a similar series of events causes said rotation to automatically terminate.

A second means for controlling the rotation of the movable section, positively and automatically stops said rotation if said section moves beyond the fully extended position. The second means is mechanical in nature and is comprised of a safety stop pad 28, cubical in shape, rigidly attached to the lower flange 20 of the track 8 near the edge 36 of the platform. If the movable section 6 overshoots the fully extended position, the drive roller 10 comes in abutting contact with the pad 28 and thereby provides a positive, mechanical stop such that the drive roller will not become disengaged from the track 8.

A third means for controlling the rotation of the movable section 6, automatically stops said rotation whenever a torque of predetermined intensity opposes said rotation. This third means can be mechanical, electrical, pneumatic or hydraulic in nature and is illustrated in FIG. 5 as including a friction roller 45 and a belt drive 53. A belt drive or a clutched power transmission (not shown) can be used in lieu of drive chain 54. The object of these combined elements is to depart rotation to the movable section 6 which will yield when opposed by a torque of predetermined intensity in the opposite direction, such as that which occurs when freight, other objects or human appendages are trapped between the movable section 6 and the inside building wall 58, as the movable section approaches its retracted position, or when the movable section strikes such objects as it is extending outwardly. In such cases, because the transmission of the power from the motor 47 to the movable section 6 is not direct or positive, the movable section's rotation will yield, thus avoiding crushing the object which caused the opposing torque. The coefficient of friction between the drive roller and the track, as well as the drive belt's tension, size, and design can be varied to adjust the predetermined torque at which the movable section will yield. Other means for accomplishing this feature include a circuit breaking device (not shown) which continuously monitors the amperage drawn by the electric drive motor 47. When the amperage reaches a predetermined level, the power to said motor is interrupted and platform rotation ceases.

A means for preventing the falling of persons and objects from the stationary section 7 is the extendable rail 59 and as illustrated in FIG. 6 and 7 is disposed inside the building 4 near the recess 15. When the movable section 6 is in the extended position, the extendable rail provides a guard over the exposed recess area to prevent accidental falls into the recess 15 from the stationary floor section 7. The extending rail 59 is comprised of a flexible line 60 such as chain, rope or cord. One end of the line 60 is attached to a resilient member 61, such as an extension spring, which is in turn attached to the rigid guard rail 62. The other end of the line 60 is attached to one end of an elongated member or gate 63 which is pivotally attached to the side of the building 4 through brackets 64. The lower end of the gate 63 has counterweights 65 attached thereto, such that the gate normally assumes vertical orientation.

In use, the extendable rail 59 functions in the following manner: when the movable section 6 is in the retracted position, the rigid guard rail 62 and the gate 63 are adjacent, and no portion of the recess 15 is exposed. When the movable section 6 is extended so as to load or unload the vehicle 2, one-half of the recess 15 is exposed, thereby creating the hazard which is alleviated by the extended rail 59. As the dock rotates outwardly, the end of rigid guard rail 62, which is affixed thereto, follows the arc of the circle. The translation of the rigid guard rail causes tension in the line 60 which, by overcoming the torque produced by the gate's counterweights 65, causes the gate 63 to rotate downwardly and thereby expand its length. When the movable section 6 reaches its fully extendable position (FIG. 7), the gate 63 and the flexible line 60 assume a substantially horizontal position and the spring 61 is extended so as to assure the tightness of the line, thereby providing a secure and reliable means for guarding the exposed edge of the recess.

When the movable section is retracted, the distance between the rigid rail 62 and the bracket 64 is shortened thereby releasing the tension in the line 60. The torque produced by the gate's counterweights 65 causes the gate 63 to rotate upwardly thereby keeping the line 60 free from interference with the returning movable section, until same is in its fully retracted position and the gate reassumes its vertical orientation.

The first means for preventing the falling of persons and objects from said movable section is the rigid rail 62, and as illustrated in FIG. 6, is attached along the inside linear edge 66 of the movable section 6. As previously described, when the movable section is rotated outwardly, a portion of the recess is exposed, thereby creating a hazard. The rigid rail 62 provides a guard against accidental falls into the recess 15 from the movable floor section 6. The rigid rail is comprised of a plurality of substantially identical posts 67 affixed perpendicularly at one end to the deck 26 of the movable section. A rail 68, is affixed to the other ends of the posts 67. The rigid rail extends along the inside edge 66 of the movable section from a center thereof to the termination of said edge. A second means for preventing the falling of persons and objects from the movable section is a removable rail 69 disposed along the arcuate edge 36 of the movable floor section 6. The rail 69 extends from the outermost edge of the deck to the drive cover 38. The rail 69 is provided with a plurality of substantially identical vertical posts 71 which are removably attached at their lower ends to the deck 26. Suitable attachment means include tapered or threaded apertures disposed in the deck. A flexible line 72 such as a rope, chain, or cord is attached to the other ends of the post 71. In use, when the movable section is at its fully extended position, the removable rail 69 is fixed in place so as to guard against falls from the deck of the movable section 6 to the ground, which is generally a substantial height. When the movable section is retracted, the rail 69 obstructs the loading platform and makes difficult access to the door 73. Hence, the rail 69 is adapted to be easily removed from the deck so as to eliminate such obstructions.

Other safety devices contemplated by the present invention include safety lights 75 and warning alarm 70. The safety lights 75 are affixed to the frame 25 directly behind two mating apertures in the face plate 35. The lights 75 warn both pedestrians and motorists that the loading platform is extended and that a portion of the passage is obstructed. The warning alarm 70 is an audio device such as a horn which is sounded prior to the extension of the movable section so as to place passersby on notice of the impending protrusion.

Although the present invention is depicted as being disposed in a closed building 4 with an opening and door 73, its application is not so limited. Among other uses, the rotatable dock can be disposed at one edge of an open loading platform (not shown) and adapted to rotate in both directions so as to accommodate vehicles which approach from any direction.

The present invention is particularly well adapted for use in a building, as the movable section 6 in its retracted position is totally enclosed in the building such that the opening can be sealed and locked by door 73 to provide protection from natural elements and security from unprivileged entry, theft and the like. The movable section can be extended through a relatively narrow opening in the building, and provides maximum dock area for the easy manipulation and movement of goods thereover.

Figure 9:
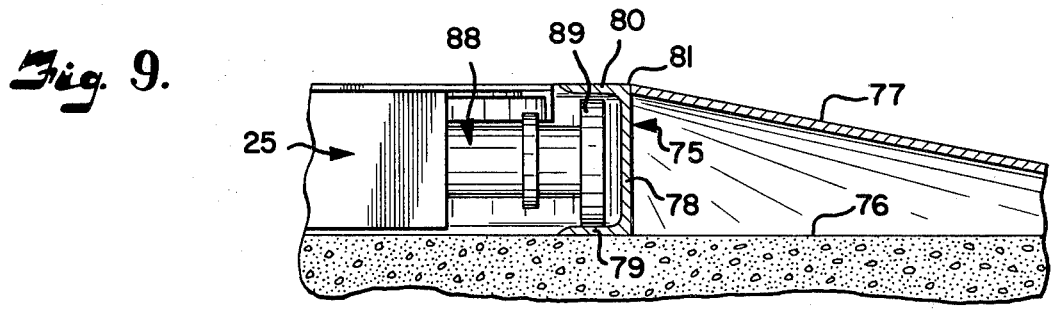
FIG. 9 is an enlarged fragmentary, horizontal cross-sectional view of the above floor embodiment taken along the line 9—9 of FIG. 8.
Figure 10:
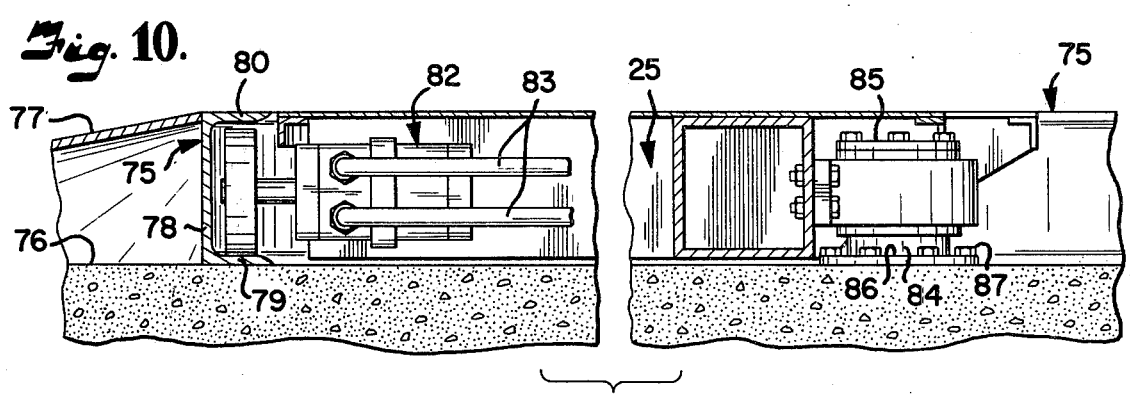
FIG. 10 is an enlarged fragmentary, horizontal cross-sectional view of the above floor embodiment taken along line 10—10 of FIG. 8.

The structure illustrated in FIGS. 8, 9 and 10 is another embodiment of the present invention which is installed on the planar surface of an existing loading platform, and does not require a recess. The track 75, in which the movable section 6 rotates, is mounted to a surface of a planar, stationary floor section 76. A ramp 77 circumscribes the arcuate portion of the movable section 6 so as to form a gently inclined surface between the floor 76 and the movable section to facilitate the transportation of goods therebetween.

The track 75 as illustrated in FIG. 10, is semicircular in shape and relatively shallow, so that the platform maintains a low vertical profile preferably less than 12 inches. Because the goods which are loaded and unloaded on this platform must be raised and lowered a distance equal to the height of the track, it is important that this height be minimized to assure a smooth and easy transport of goods thereover. The track has a C-shaped cross-section, and is comprised of a web 78, and respective lower and upper flanges 79 and 80. The lower flange 79 is securely attached to the floor 76.

A ribbon-shaped dock ramp 77 circumscribes the arcuate portion of the movable section 6 and is attached at one edge to the upper, outward edge 81 of the track 75. The other edge of the ramp 77 is affixed to the floor 76. The width of the ramp 77 is relatively wide preferably in the nature of at least three feet, such that its inclination is slight. The enclosure formed by the abutment of floor 76, web 78 and ramp 77, is a semi-toroidal structure having a right triangular cross section. Hence, the ramp 77 forms a gently inclined surface between the floor 76 and the deck of the movable section to facilitate the transportation of goods therebetween.

The drive means 82 is preferably hydraulic in order to minimize the platform's height. The hydraulic hoses 83 which are attached to the drive means 82 are shown routed along the inside wall of the building 4 and around the central pivot members 84 and 85 so that rotation of the movable member will not entangle the hoses. The central pivot members 84 and 85 are selected and attached to the frame 25 in a manner which minimizes the platform's height. The first central pivot member 84 is cylindrical in shape and has a flange 86 disposed about its lower end. The flange 86 is attached to the floor 76 by suitable fastening means such as bolts 87. The second central pivot member 85, which is similarly shaped, mates with the first central pivot member 84 and is attached to the frame 25.

The free wheeling roller 88 is similar to that of the previous embodiment, except that the wheel portion thereof has been eliminated. The roller 88 is comprised of bearing 89, and the outer circumferential surface of the housing makes rolling contact with the lower flange 79 of the track 75. The roller translates between the lower and upper flanges 79 and 80 of the track, the upper flange being disposed slightly above the roller such that the slightest vertical translation of the roller causes the roller to contact the lower surface of flange 80 and roll thereon, thus restraining further vertical motion.

It is to be understood that while we have illustrated and described certain forms of our invention, it is not to be limited to the specific form or arrangement of parts herein described and shown.

What we claim and desire to secure by Letters Patent is:

1. A loading dock comprising:
   a. a stationary floor section;
   b. a movable floor section disposed at one edge of said dock, and meeting said stationary section along the arc of a circle;

c. means for rotatably supporting said movable section;
d. said movable section having an edge portion at the edge of said dock which is rotated to align a portion thereof with the loading opening in the body of a vehicle alongside said dock;
e. power means, operably connected to said movable section for selectively rotating said movable section to said vehicle;
f. means for controlling the rotation of said movable section whereby a torque of predetermined intensity will cause said rotation to cease;
g. a guard rail, removably attached to a portion of the arcuate periphery of said movable section for preventing the falling of persons and objects therefrom; and
h. an extendible guard rail, extending outwardly from the arcuate periphery of said movable section and along a portion thereof, one end of said extendible rail being attached to an immovable portion of said dock, for preventing the falling of persons and objects from said stationary section.

2. Apparatus as set forth in claim 1 wherein:
a. said power means rotating said movable section to position said edge portion substantially normal to the edge of said dock, aligns said edge portion with the loading opening of a stationary vehicle disposed a predetermined distance from the center of said circle and parallel to said dock.

3. Apparatus as set forth in claim 2 wherein:
a. said track is channelshaped having a vertical member and an upper and a lower horizontal member rigidly and perpendicularly attached to the ends thereof;
b. a shaft is attached to said frame and extends radially and outwardly therefrom for mounting said freewheeling roller thereon;
c. said freewheeling roller includes;
 1. a wheel rollingly engaging the lower member of said track;
 2. a first bearing disposed in said wheel on said shaft, coaxially therewith for facilitating the rotation of said wheel;
 3. a second bearing disposed radially outwardly of said wheel, adjacent thereto, an inner housing of which being mounted on said shaft, an outer housing of which rollingly engages the upper member of said track such that vertical translation of the shaft due to the loading of a cantilevered portion of said dock is restrained.

4. A loading dock comprising:
a. a stationary floor section;
b. a movable floor section disposed at one edge of said dock, and meeting said stationary section along the arc of a circle;
c. means for rotatably supporting said movable section;
d. said movable section having an edge portion at the edge of said dock which is rotated to align a portion thereof with the loading opening in the body of a vehicle alongside said dock;
e. power means, operably connected to said movable section for selectively rotating said movable section to said vehicle;
f. said stationary floor section includes:
 1. a semicircular recess into which said movable floor section is disposed;
 2. a track disposed in said recess about its arcuate periphery;
 3. a first central pivot member diposed at the center of said recess and affixed thereto, rotatably supporting said movable section;
g. said movable floor section includes:
 1. a frame for supporting said movable section;
 2. a deck disposed on said frame to provide a surface for said movable section;
 3. a second central pivot member affixed to said frame, and mating with said first central pivot member, for rotating said movable section;
 4. a freewheeling roller which translates in said track and is rotatably mounted on said frame;
 5. a drive roller which translates in said track, is rotatably mounted on said frame and is rotated by said power means so as to cause said movable section to rotate;
h. safety means including:
 1. means for controlling the rotation of said movable section whereby a torque of predetermined intensity will cause said rotation to cease;
 2. a guard rail, removably attached to a portion of the arcuate periphery of said movable section for preventing the falling of persons and objects therefrom; and
 3. an extendible guard rail, extending outwardly from the arcuate periphery of said movable section and along a portion thereof, one end of said extendible rail being attached to an immovable portion of said dock, for preventing the falling of persons and objects from said stationary section.

5. A loading dock comprising:
a. a stationary floor section;
b. a movable floor section disposed at one edge of said dock, and meeting said stationary section along the arc of a circle;
c. means for rotatably supporting said movable section;
d. said movable section having an edge portion at the edge of said dock which is rotated to align a portion thereof with the loading opening in the body of a vehicle alongside said dock;
e. power means, operably connected to said movable section for selectively rotating said movable section to said vehicle;
f. said stationary floor section includes:
 1. a track extending about the semicircular arc of said circle, and attached to the surface of a floor in said loading dock for mounting said movable section therein;
 2. a dock ramp attached at one edge thereof to the upper surface of said track and at the other edge thereof to said floor so as to form a gently inclined ramp between surfaces of said floor and said movable floor section;
 3. a first central pivot member attached to said floor and disposed at the center of said circle, for rotating said movable section;
g. said movable floor section includes:
 1. a frame for supporting said movable section;
 2. a deck disposed on said frame to provide a surface for said movable section;
 3. a second central pivot member affixed to said frame, and mating with said first central pivot member, for rotating said movable section;
 4. a freewheeling roller which translates in said track and is rotatably mounted to said frame;

5. a drive roller which translates in said track, is rotatably mounted to said frame and is rotated by said power means so as to cause said movable section to rotate;

h. safety means including:
1. means for controlling the rotation of said movable section whereby a torque of predetermined intensity will cause said rotation to cease;
2. a guard rail, removably attached to a portion of the arcuate periphery of said movable section for preventing the falling of persons and objects therefrom; and
3. an extendible guard rail, extending outwardly from the arcuate periphery of said movable section and along a portion thereof, one end of said extendible rail being attached to an immovable portion of said dock, for preventing the falling of persons and objects from said stationary section.

6. A loading dock comprising:
a. a stationary floor section;
b. a movable floor section disposed at one edge of said dock, and meeting said stationary section along the arc of a circle;
c. means for rotatably supporting said movable section;
d. said movable section having an edge portion at the edge of said dock which is rotated to align a portion thereof with the loading opening in the body of a vehicle alongside said dock;
e. power means, operably connected to said movable section for selectively rotating said movable section to said vehicle;
f. said stationary floor section includes:
1. a track extending about the semicircular arc of said circle, and attached to the surface of a floor in said loading dock for mounting said movable section therein;
2. a dock ramp attached at one edge thereof to the upper surface of said track and at the other edge thereof to said floor so as to form a gently inclined ramp between surfaces of said floor and said movable floor section;
3. a first central pivot member attached to said floor and disposed at the center of said circle, for rotating said movable section;
g. said movable floor section includes:
1. a frame for supporting said movable section;
2. a deck disposed on said frame to provide a surface for said movable section;
3. a second central pivot member affixed to said frame, and mating with said first central pivot member, for rotating said movable section;
4. a freewheeling roller which translates in said track and is rotatably mounted to said frame; and
5. a drive roller which translates in said track, is rotatably mounted to said frame and is rotated by said power means so as to cause said movable section to rotate.

7. A loading structure comprising:
a. a building having a wall alongside of a drive for cargo carrying vehicles, said building having a floor approximately at normal dock height and a door opening in said wall;
b. a dock platform generally semicircular in shape and having a straight edge adjacent to and substantially parallel to said building wall and a periphery inside and adjacent one side of said door opening, said dock platform having a radial dimension less than the width of the door opening;
c. means mounting said dock platform in the building for rotation about an axis adjacent to the other side of said door opening with rotation of the dock platform moving a portion thereof outwardly through said door opening to a cantilevered position with a straight edge of the dock platform at an angle of as great as 90° to the building wall and for substantially engaging a rear portion of a cargo vehicle positioned in the drive for loading and unloading; and
d. power means operatively connected to said dock platform for selectively rotating same.

8. A loading structure as set forth in claim 7 wherein:
a. said building floor has a semicircular recess to receive said dock platform;
b. said means rotatably mounting the dock platform include a peripheral track in an arcuate portion of said recess and a plurality of guide rollers on the platform engaging said track;
c. said dock platform having a frame of interconnected support members in a grid and a deck secured to said frame; and
d. said deck and the building floor being substantially coplanar.

* * * * *